United States Patent
Yanagi

(10) Patent No.: US 10,609,306 B2
(45) Date of Patent: Mar. 31, 2020

(54) IMAGE PROCESSING APPARATUS, IMAGE PROCESSING METHOD AND STORAGE MEDIUM

(71) Applicant: CASIO COMPUTER CO., LTD., Tokyo (JP)

(72) Inventor: Kazunori Yanagi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 62 days.

(21) Appl. No.: 15/467,577

(22) Filed: Mar. 23, 2017

(65) Prior Publication Data

US 2017/0347024 A1    Nov. 30, 2017

(30) Foreign Application Priority Data

May 30, 2016    (JP) ................................. 2016-107130

(51) Int. Cl.
*H04N 5/232*    (2006.01)
*H04N 5/265*    (2006.01)
*B60R 1/12*    (2006.01)

(52) U.S. Cl.
CPC ......... *H04N 5/265* (2013.01); *H04N 5/23232* (2013.01); *B60R 2001/1215* (2013.01); *B60R 2300/10* (2013.01); *H04N 5/23238* (2013.01)

(58) Field of Classification Search
CPC ........ B60R 2300/303; B60R 2300/304; B60R 2300/305
See application file for complete search history.

(56) References Cited

U.S. PATENT DOCUMENTS

| | | | | |
|---|---|---|---|---|
| 8,018,490 B2 * | 9/2011 | Yuasa | ....................... | B60R 1/00 348/148 |
| 2007/0165108 A1 * | 7/2007 | Yuasa | ....................... | B60R 1/00 348/148 |
| 2008/0243343 A1 * | 10/2008 | Kumagai | ............ | B60R 21/0134 701/46 |
| 2009/0009314 A1 * | 1/2009 | Taniguchi | ................. | B60R 1/00 340/461 |

(Continued)

FOREIGN PATENT DOCUMENTS

| JP | 2003-087781 A | 3/2003 |
|---|---|---|
| JP | 2008-507449 A | 3/2008 |

(Continued)

OTHER PUBLICATIONS

Schill F, Mahony R, Corke P. Estimating ego-motion in panoramic image sequences with inertial measurements. InRobotics Research 2011 (pp. 87-101). Springer, Berlin, Heidelberg. (Year: 2011).*

(Continued)

*Primary Examiner* — Clifford Hilaire
(74) *Attorney, Agent, or Firm* — Fitch, Even, Tabin & Flannery LLP

(57) ABSTRACT

From among two images and whose imaging timings are the same and imaging directions are different, one image whose imaging direction has a predetermined relation with that of the other image is specified as a target to be divided, and this target image is divided into a first partial image and a second partial image. Then, the first partial image and the second partial image are combined with the edges of the other image located in the direction perpendicular to the imaging direction, respectively.

7 Claims, 6 Drawing Sheets

(56) References Cited

U.S. PATENT DOCUMENTS

| | | | | |
|---|---|---|---|---|
| 2012/0206565 A1* | 8/2012 | Villmer | .................... | H04N 1/00 |
| | | | | 348/36 |
| 2013/0215274 A1* | 8/2013 | Son | ....................... | B60W 40/09 |
| | | | | 348/149 |
| 2013/0300828 A1* | 11/2013 | Yamato | .................. | G03B 35/08 |
| | | | | 348/44 |
| 2014/0340516 A1* | 11/2014 | Vojtisek | .................... | B60R 1/00 |
| | | | | 348/148 |

FOREIGN PATENT DOCUMENTS

| | | |
|---|---|---|
| JP | 2009-089910 A | 4/2009 |
| WO | 2006/022630 A1 | 3/2006 |

OTHER PUBLICATIONS

Moghadam P, Starzyk JA, Wijesoma WS. Fast vanishing-point detection in unstructured environments. IEEE Transactions on Image Processing. Jul. 18, 2011;21(1):425-30. (Year: 2011).*

JPO; Application No. 2016-107130; Notification of Reasons for Rejection dated Aug. 16, 2019.

* cited by examiner

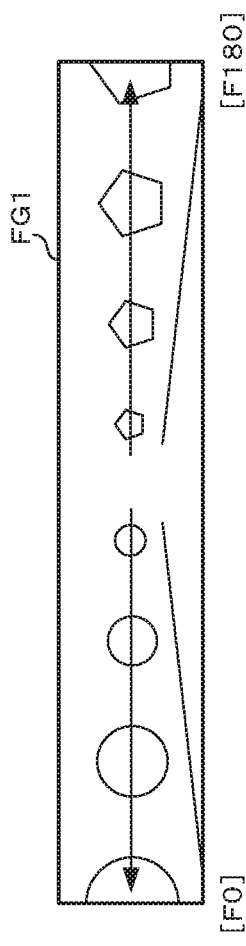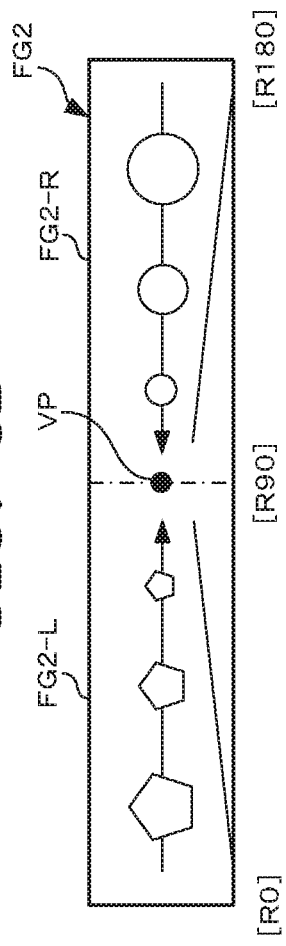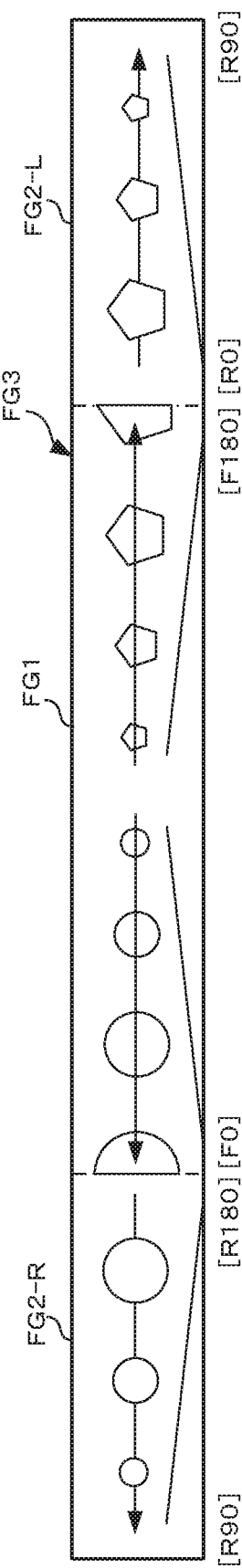

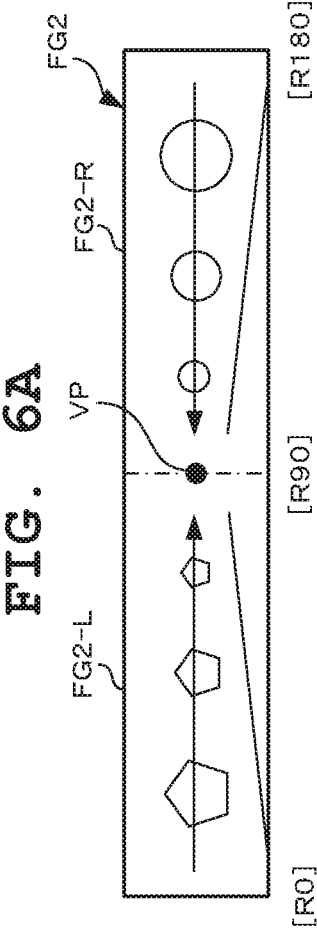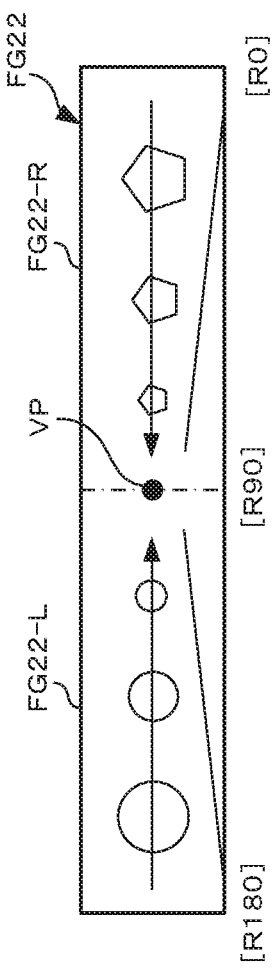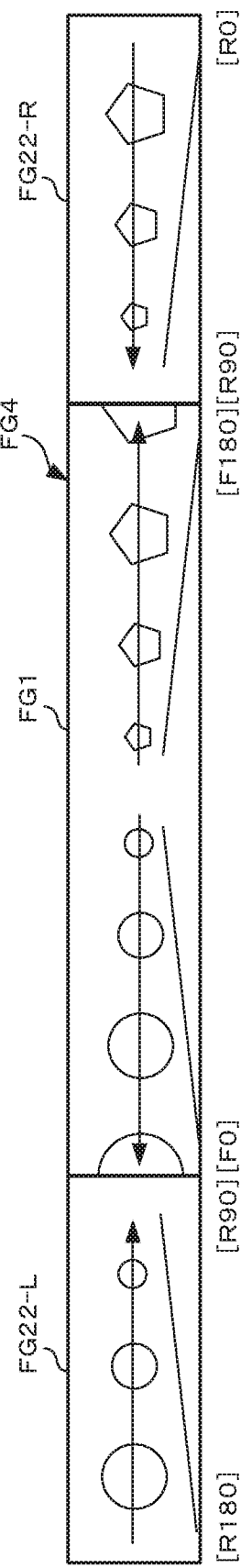

IMAGE PROCESSING APPARATUS, IMAGE PROCESSING METHOD AND STORAGE MEDIUM

CROSS-REFERENCE TO RELATED APPLICATION

This application is based upon and claims the benefit of priority from the prior Japanese Patent Application No. 2016-107130, filed May 30, 2016, the entire contents of which are incorporated herein by reference.

BACKGROUND OF THE INVENTION

1. Field of the Invention

The present invention relates to an image processing apparatus, an image processing method and a storage medium.

2. Description of the Related Art

Conventionally, a technology has been disclosed in which moving images acquired by a plurality of cameras simultaneously capturing images of views in different directions are simultaneously replayed and displayed on a screen, as shown in Japanese Unexamined Patent Application (Kohyo—Translation of PCT application) Publication No. JP 2008-507449.

With this technology, the user can see images of views in different directions simultaneously.

SUMMARY OF THE INVENTION

In accordance with one aspect of the present invention, there is provided an image processing apparatus comprising: an image acquiring section which acquires two images whose imaging timings are same and imaging directions are different; a dividing section which divides, from among the two images acquired by the image acquiring section, one image whose imaging direction has a predetermined relation with an imaging direction of the other image into a first partial image and a second partial image; and a combining section which combines the first partial image and the second partial image with edges of the other image, respectively.

In accordance with another aspect of the present invention, there is provided an image processing method comprising: an image acquiring step of acquiring two images whose imaging timings are same and imaging directions are different; a dividing step of dividing, from among the two images acquired in the image acquiring step, one image whose imaging direction has a predetermined relation with an imaging direction of the other image into a first partial image and a second partial image; and a combining step of combining the first partial image and the second partial image with edges of the other image, respectively.

In accordance with another aspect of the present invention, there is provided an non-transitory computer-readable storage medium having stored thereon a program that is executable by a computer to actualize functions comprising: image acquiring processing for acquiring two images whose imaging timings are same and imaging directions are different; dividing processing for dividing, from among the two images acquired in the image acquiring processing, one image whose imaging direction has a predetermined relation with an imaging direction of the other image into a first partial image and a second partial image; and combining processing for combining the first partial image and the second partial image with edges of the other image, respectively.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5A is a diagram showing an example of the image motion vector group in the first moving image data;

FIG. 5B is a diagram showing an example of the image motion vector group in the second moving image data;

FIG. 5C is a diagram showing details of processing that is performed by the image processing apparatus in a first mode;

FIG. 6A is a diagram showing an example of the image motion vector group in the second moving image data;

FIG. 6B is a diagram showing an example of the image motion vector group in the second moving image data; and FIG. 6C is a diagram showing details of processing that is performed by the image processing apparatus in a second mode.

DETAILED DESCRIPTION OF THE PREFERRED EMBODIMENTS

Figure 1:
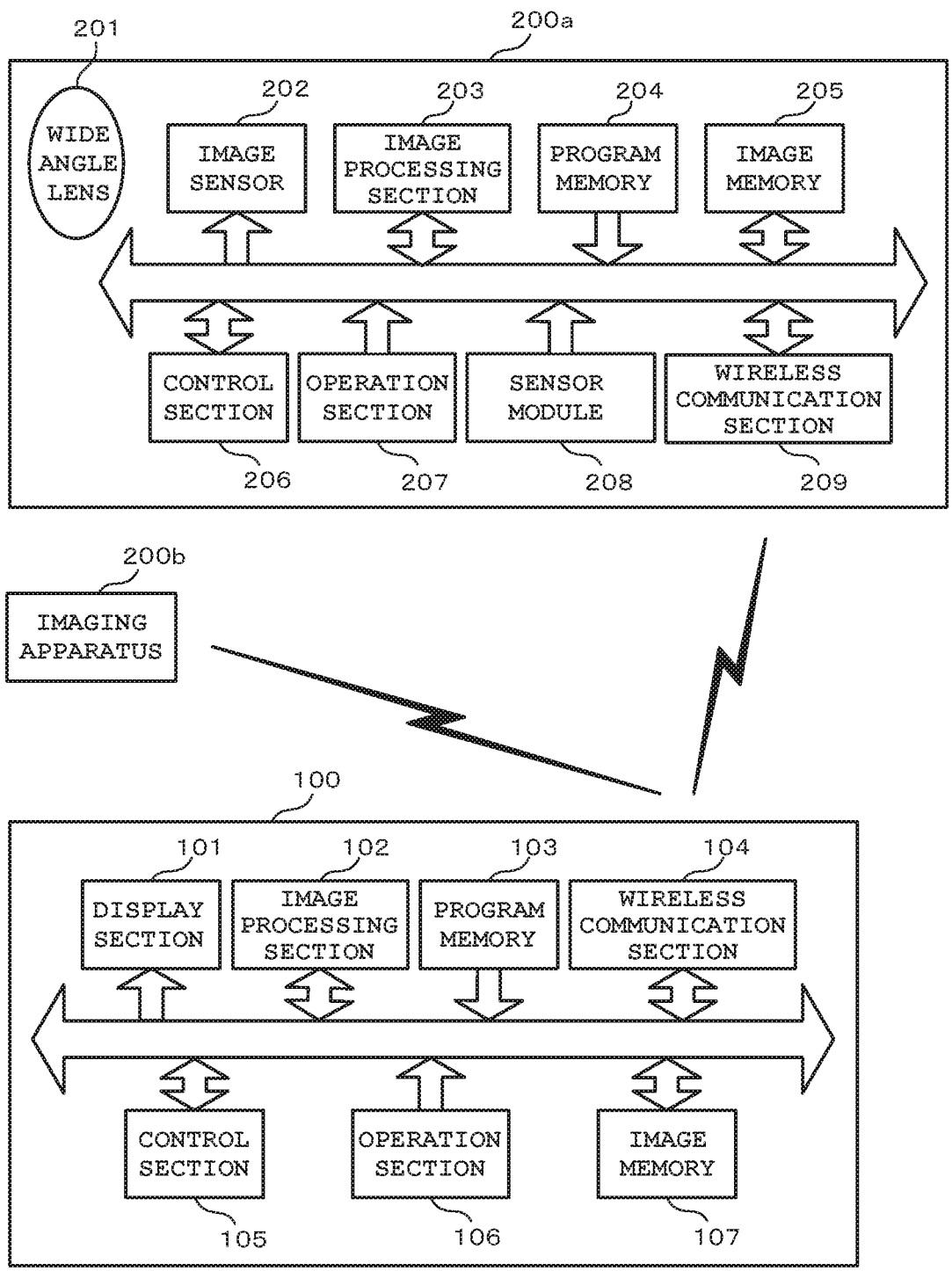
FIG. 1 is a block diagram showing main sections of an image processing apparatus and imaging apparatuses according to an embodiment of the present invention.

An embodiment of the present invention will hereinafter be described. FIG. 1 is a block diagram showing main sections of an image processing apparatus 100 and imaging apparatuses 200a and 200b that are communicable with the image processing apparatus 100, which are exemplarily described as an embodiment of the present invention.

The image processing apparatus 100 has a function for wirelessly acquiring two pieces of moving image data which have been captured by and stored in the imaging apparatuses 200a and 200b, respectively, a function for generating new moving image data based on both of these acquired moving image data, a function for displaying and replaying a moving image based on the generated moving image data, and a function for storing the moving image data, as described later.

More specifically, the image processing apparatus 100 is actualized by a smart phone (multifunctional mobile phone), a tablet type personal computer, etc., and includes a display section 101, an image processing section 102, a program memory 103, a wireless communication section 104, a control section 105, an operation section 106, and an image memory 107.

The wireless communication section 104 acquires moving image data from the imaging apparatuses 200a and 200b (hereinafter separately referred to as "first imaging apparatus 200a" and "second imaging apparatus 200b") by use of a wireless communication technology. As the wireless communication technology for the wireless communication section 104, for example, Wi-Fi (Wireless Fidelity: registered trademark) technology that applies the International Standard IEEE-802.11 series or Bluetooth (registered trademark) technology is adopted. However, as long as moving image data can be received, any technology can be adopted regardless of whether it is wireless communication means or wired communication means. The image memory 107 is constituted by, for example, a flash memory, and stores moving image data and the like acquired by the wireless communication section 104. The image processing section 102 includes an image processing circuit that generates new moving image data described later from moving image data stored in the image memory 107. Note that this moving image data generated by the image processing section 102 is also stored in the image memory 107.

The display section 101 is constituted by a liquid crystal panel, its drive circuit, and the like, and displays a moving image based on pieces of moving image data received from the first imaging apparatus 200a and the second imaging apparatus 200b or moving image data generated by the image processing section 102 and stored in the image memory 107.

The operation section 106 is constituted by a power switch and operation buttons for a user to operate the image processing apparatus 100, and provides information regarding the user's operation to the control section 105. Note that the operation section 106 includes a touch panel integrally provided on the surface of the liquid crystal panel.

The program memory 103 is constituted by a rewritable non-volatile memory such as a flash memory, and stores a base program required for the operation control of the image processing apparatus 100, and various types of application programs. The control section 105 is constituted by a CPU (Central Processing Unit), its peripheral circuits, a memory, etc., and controls the entire image processing apparatus 100 with reference to operation information provided from the operation section 106, in accordance with the base program stored in the program memory 103. In particular, the control section 105 performs processing shown in FIG. 2 and FIG. 3 described later, in accordance with a predetermined image processing program stored in the program memory 103.

Note that, in a case where the image processing apparatus 100 is an smartphone, it includes well-known circuits for performing voice communication and data communication, that is, a voice input circuit that modulates and transmits an inputted voice, a transmission circuit, a reception circuit that receives, decodes, and reproduces a voice signal, a regeneration circuit, a data transmission and reception circuit, and the like, in addition to the above-described sections. Also, the image processing program is provided as an application program.

On the other hand, the first imaging apparatus 200a and the second imaging apparatus 200b each include sections for capturing and storing moving images and transmitting the stored moving image data to the image processing apparatus 100 as needed.

That is, the first imaging apparatus 200a is equipped with an image sensor 202 such as a CMOS (Complementary Metal Oxide Semiconductor) or a CCD (Charge Coupled Device) that captures a photographic subject through a wide angle lens 201; an image processing section 203 that amplifies an imaging signal outputted from the image sensor 202, converts it to a digital signal, and compresses image data acquired by the conversion to the digital signal; and an image memory 205 that stores compressed image data as a still image file or a moving image file, as shown in FIG. 1. Note that the wide angle lens 201 herein has a viewing angle of 180 degrees in a horizontal direction.

This first imaging apparatus 200a is also equipped with a program memory 204, a control section 206, an operation section 207, a sensor module 208, and a wireless communication section 209. The wireless communication section 209 transmits moving image data (moving image file) stored in the image memory 205 to an external device, such as the image processing apparatus 100, as needed by using the Wi-Fi (registered trademark) technology that applies the International Standard IEEE-802.11 series, the Bluetooth (registered trademark) technology, or the like.

The sensor module 208 converts detection signals from a motion sensor for detecting accelerations in three axis directions, a gyroscope sensor, a GPS antenna, and the like into digital signals, and provides them to the control section 206 as movement information indicating whether the imaging apparatus 200a is moving and its movement direction. The operation section 207 is constituted by a power switch and one or a plurality of manual operation buttons for a user to operate the first imaging apparatus 200a, and provides information regarding an operation by the user to the control section 206.

The control section 206 is constituted by a CPU, its peripheral circuit, a memory, etc., and controls each section of the first imaging apparatus 200a with reference to operation information provided from the operation section 207 and movement information provided from the sensor module 208, in accordance with a program stored in the program memory 204. That is, it controls moving image capture operations in the first imaging apparatus 200a.

In this first imaging apparatus 200a, whether or not to record a movement direction during moving image capturing can be set by the user. When the user sets it to record a movement direction, the control section 206 in moving image capturing sequentially calculates the movement direction of the first imaging apparatus 200a relative to the imaging direction (the direction toward the photographic subject along the optical axis of the wide angle lens 201), based on the above-described movement information, and stores this information (hereinafter referred to as imaging direction information) in association with each frame of the moving image.

Note that, although not shown, the second imaging apparatus 200b has the same structure as that of the first imaging apparatus 200a.

Hereafter, an operation of the image processing apparatus 100 according to the present invention is described using an example where the first imaging apparatus 200a and the second imaging apparatus 200b which can communicate with the image processing apparatus 100 have been arranged on an arbitrary moving object such as a vehicle, and pieces of moving image data (moving image files) acquired by capturing views in the front and rear directions of the moving object have been stored in their image memories 205, respectively.

Figure 4A:
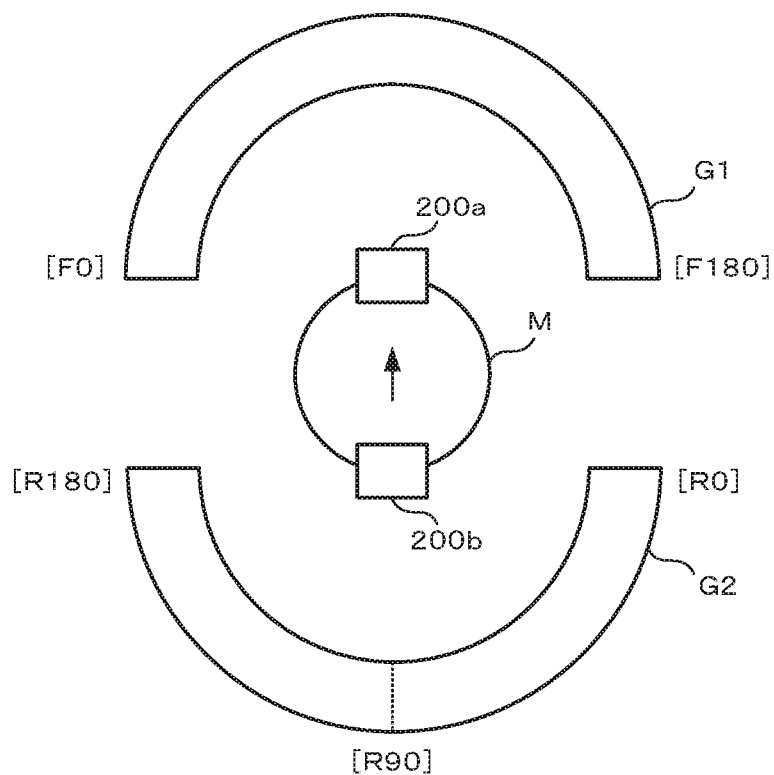
FIG. 4A is a diagram showing the arrangement of a first imaging apparatus 200a and a second imaging apparatus 200b on a moving object.

FIG. 4A is a schematic diagram showing the arrangement of the first imaging apparatus 200a and the second imaging apparatus 200b on the moving object M and their imaging ranges. The first imaging apparatus 200a is positioned on an end portion of the moving object M on the front side (progressing direction side) which is indicated in the diagram by an arrow, and the second imaging apparatus 200b is positioned on an end portion of the moving object M on the rear side (the reverse direction side of the progressing direction side).

As described above, the first imaging apparatus 200a has a viewing angle of 180 degrees in a horizontal direction. In the image memory 205 of this first imaging apparatus 200a, a moving image file has been stored which includes first moving image data G1 acquired by an area between [F0] and [F180] in the front direction of the moving object M in the diagram being captured. The second imaging apparatus 200b also has a viewing angle of 180 degrees in a horizontal direction. In the image memory 205 of this second imaging apparatus 200b, a moving image file has been stored which includes second moving image data G2 acquired by an area between [R0] and [R180] in the rear direction of the moving object M in the diagram being captured. Note that, in this example, only the above-described single moving image file has been stored in each of the first imaging apparatus 200a and the second imaging apparatus 200b.

Figure 2:
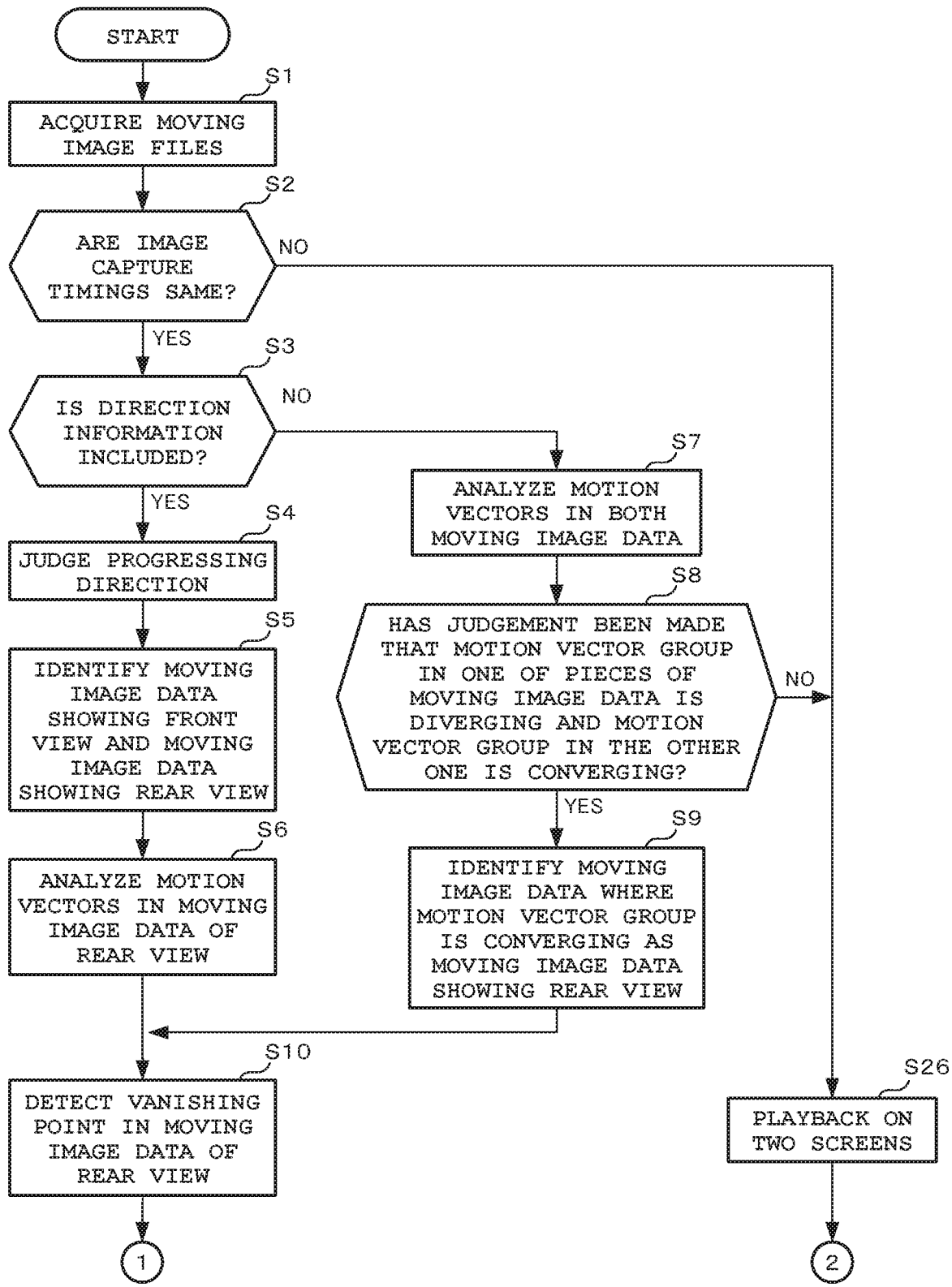
FIG. 2 is a flowchart showing the procedure of processing that is performed by the image processing apparatus.
Figure 3:
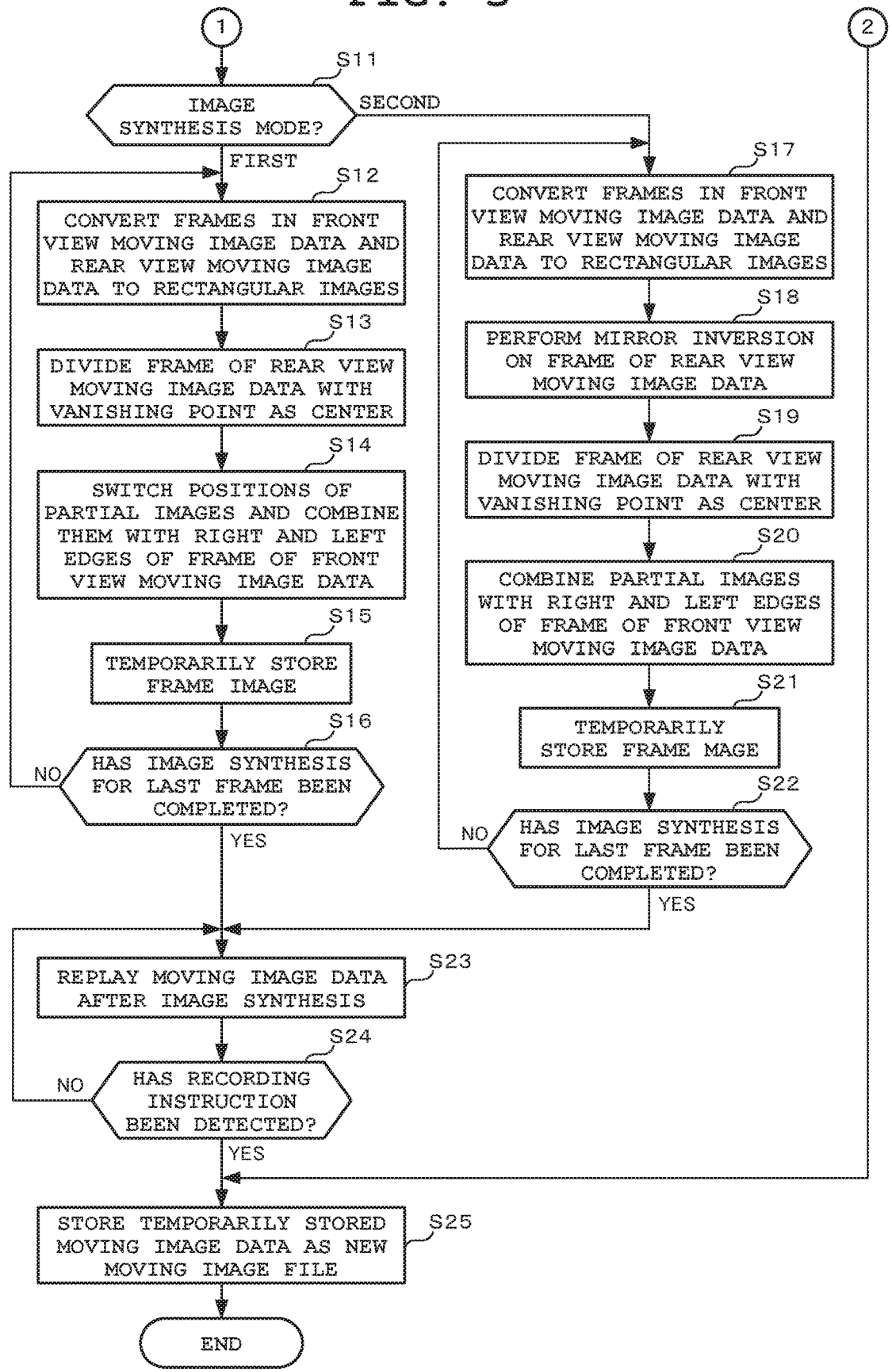
FIG. 3 is a flowchart following that of FIG. 2.

FIG. 2 and FIG. 3 are flowcharts showing the main portions of the procedure of processing that is performed by the control section 105 of the image processing apparatus 100 in accordance with the predetermined image processing program stored in the program memory 103.

When an instruction to start operating is provided by a user operating an operation button of the operation section 106, the control section 105 immediately starts operating so as to start communication with the first imaging apparatus 200 and the second imaging apparatus 300 via the wireless communication section 104 and acquire the moving image files respectively stored in their image memories 205 (Step S1).

Next, the control section 105 judges whether the image capture timings (date and time) of the acquired moving image files are the same. Then, when judged that they are not the same (NO at Step S2), the control section 105 replays the first moving image data G1 and the second moving image data G2 based on the moving image files, respectively (Step S26). Note that, in this case, the control section 105 ends the entire processing when the playback of the two moving image data G1 and G2 is completed.

Conversely, when judged that the image capture timings of the acquired moving image files are the same (YES at Step S2), the control section 105 further judges whether imaging direction information is included in both of the moving image files (Step S3).

Here, when judged that imaging direction information is in at least one of the moving image files (YES at Step S3), the control section 105 judges the progressing direction (the movement direction relative to the imaging direction) of the first imaging apparatus 200a and the second imaging apparatus 200b at the time of the moving image capturing, based on the imaging direction information (Step S4). Then, the control section 105 identifies moving image data showing a front view and moving image data showing a rear view from among the two pieces of moving image data of the moving image files, based on the judged progressing direction (Step S5).

Next, the control section 105 analyzes motion vectors in the moving image (the second moving image data G2 in this example) of the rear view (Step S6). More specifically, the control section 105 first corrects, for two or more serial frame images of the moving image data, geometric distortion (distortion aberration) due to the optical property of the wide angle lens 201. Subsequently, the control section 105 divides each of the corrected frame images into a plurality of macro blocks. Then, the control section 105 analyzes a motion vector for each macro block by using a known method such as the block matching method.

Figure 4B:
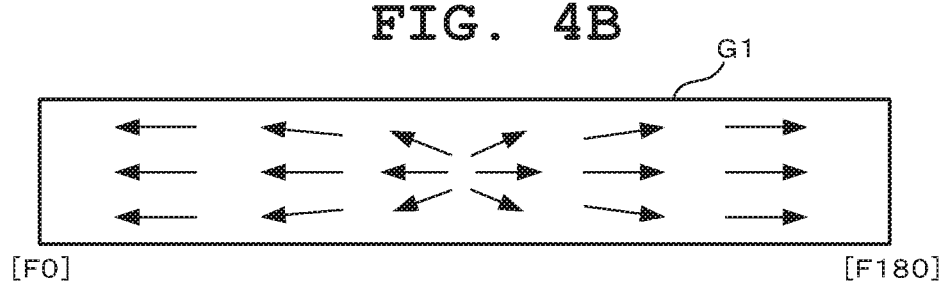
FIG. 4B is a diagram showing an example of an image motion vector group in first moving image data.
Figure 4C:
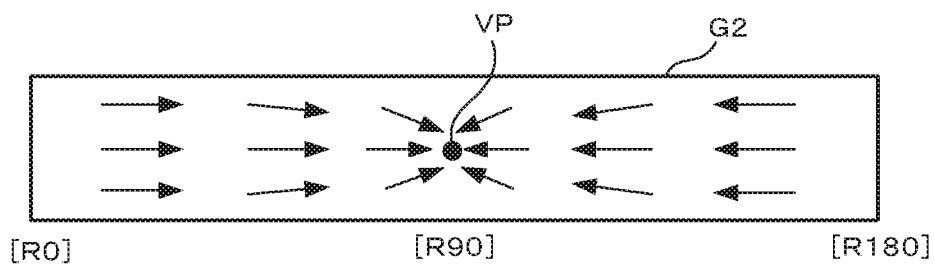
FIG. 4C is a diagram showing an example of an image motion vector group in second moving image data.

FIG. 4C is a diagram where an example of the motion vector group analyzed in the moving image (the second moving image data G2) of the rear view is shown using arrows for descriptive purposes. Note that the macro blocks in the analysis of the motions vectors are not necessarily be blocks acquired by an image being divided, and may be predetermined plural blocks that are distant from one another.

Then, the control section 105 detects a vanishing point VP based on the motion vector group in the moving image of the rear view (Step S10). In this processing, assuming that the motion vectors indicate the extending directions of perspective lines in the perspective method, the control section 105 detects a point where the virtual perspective lines represented by the motion vectors converge, as the vanishing point VP. Note that the virtual perspective lines do not always converge to one point. Therefore, in the processing of Step S10, the control section 105 searches for an area which has a predetermined size and in which the converging level of the virtual perspective lines is highest, and takes its center as the vanishing point. Also note that there is a case where the vanishing point VP is located outside the image.

At Step S3, when judged that no imaging direction information is in the moving image files having the same recording date and time (NO at Step S3), the control section 105 analyzes motion vectors in both moving image data of the moving image files (Step S7). That is, the control section 105 performs the same processing as that of Step S6 for both moving image data individually. FIG. 4B is a diagram where an example of each motion vector in the moving image data (the first moving image data G1) of the front view is shown using an arrow for descriptive purposes.

Then, the control section 105 judges whether or not a motion vector group in one of the pieces of moving image data (the first moving image data G1 and the second moving image data G2) is diverging toward the outside of the image and a motion vector group in the other one is converging toward the inside of the image (Step S8).

Here, when a judgment result is "NO" (NO at Step S8), the control section 105 replays both moving images, respectively, and displays them on two screens on the display section 101 (Step S26). Then, the control section 105 ends the entire processing when the playback of these moving images is completed.

Conversely, when judged that a motion vector group in one of the pieces of moving image data is diverging toward the outside of the image and a motion vector group in the other one is converging toward the inside of the image as shown in FIG. 4B and FIG. 4C (YES at Step S8), the control section 105 identifies the moving image data where the motion vector group is converging as moving image data showing a rear view (Step S9).

That is, when the motion vector groups of the pieces of moving image data are in states shown in FIG. 4B and FIG. 4C, the second moving image data G2 is identified at this point as moving image data showing a rear view.

Then, the control section 105 proceeds to the above-described Step S10, and detects a vanishing point VP for the moving image data (the second moving image data G2) of the rear view based on its motion vector group analyzed by the processing of Step S8.

Next, the control section 105 performs processing shown in FIG. 3. First, the control section 105 judges the type of an image synthesis mode set by the user and, when judged that the first mode has been set as this image synthesis mode (Step S11: FIRST), performs processing of Step S12 and the following steps. When judged that the second mode has been set as this image synthesis mode (Step S11: SECOND), the control section 105 performs processing of Step S17 and the following steps. Note that the first moving image data G1 is hereinafter referred to as front view moving image data and the second moving image data G2 is hereinafter referred to as rear view moving image data.

First, the case is described in which the first mode has been set. FIG. 5A to FIG. 5C are diagrams for explaining processing contents in the first mode. Note that FIG. 5A and FIG. 5B correspond to FIG. 4B and FIG. 4C, respectively.

In the first mode, the control section 105 first converts the images of frames (hereinafter referred to as frame images) in the front view moving image data G1 and the rear view moving image data G2 to rectangular images in frame order (Step S12). In this processing, geometric distortion (distortion aberration) due to the optical property of the wide angle lens 201 is corrected. FIG. 5A is a diagram showing a frame image FG1 of the front view moving image data G1 converted to a rectangular image, and FIG. 5B is a diagram showing a frame image FG2 of the rear view moving image data G2 converted to a rectangular image.

Next, the control section 105 divides the frame image FG2 of the rear view moving image data G2 into right and left images with the vanishing point VP detected at Step S10 as a dividing point (Step S13). For example, in a case where the vanishing point VP is at the center of the frame image FG2 in the horizontal direction as shown in FIG. 5B, the control section 105 divides the frame image FG2 into a partial image FG2-L that is the left half of the frame image FG2 including an imaging area between [R0] and [R90] and a partial image FG2-R that is the right half of the frame image FG2 including an imaging area between [R90] and [R180].

Next, the control section 105 switches the positions of the right and left partial images FG2-R and FG2-L, and combines them with the right and left edges of the frame image FG1 of the front view moving image data G1, respectively (Step S14). That is, a new frame image FG3 is generated in which the left partial image FG2-L has been combined with the right edge of the frame image FG1 of the front view moving image data G1 and the right partial image FG2-R has been combined with the left edge of the frame image FG1 of the front view moving image data G1, as shown in FIG. 5C. Note that arrows shown in the frame images FG1, FG2, and FG3 in FIG. 5A to FIG. 5C indicate, for descriptive purposes, the movement directions of photographic subjects in each image in the front view moving image data G1 and the rear view moving image data G2.

Then, the control section 105 temporarily stores the frame image FG3 acquired by the image synthesis (Step S15). Hereafter, until image synthesis for the last frame is completed, the control section 105 repeats the processing of Step S12 and the following steps (NO at Step S16). Then, when image synthesis processing for the last frame is completed (YES at Step S16), the control section 105 replays on the display section 101 the moving image of moving image data including the temporarily stored frame image FG3 (Step S23).

As a result, the front view moving image data G1 and the rear view moving image data G2 can be shown to the user as a moving image showing substantially the entire surrounding area of the moving object M with the front view moving image data G1 being positioned at the center of frame images to be replayed.

Then, until a recording instruction is given from the user, the control section 105 continues the playback of the moving image (NO at Step S24). When a recording instruction is detected (YES at Step S24), the control section 105 stores the temporarily stored moving image data acquired by the image synthesis as a new moving image file, in the image memory 107 (Step S25), and ends the processing.

Next, the case is described in which the second mode has been set. This second mode is a mode set for a case where the moving object M is an automobile and the first imaging apparatus 200a and the second imaging apparatus 200b are used to capture front and rear views of the automobile. FIG. 6A to FIG. 6C are diagrams for explaining processing contents in the second mode. Note that FIG. 6A and FIG. 6B correspond to FIG. 4C and FIG. 4B, respectively.

In the second mode as well, the control section 105 converts the frame images in the front view moving image data G1 and the rear view moving image data G2 to rectangular images in frame order, as in the processing of Step S12 (Step S17).

Next, the control section 105 performs mirror inversion on a converted frame image FG2 of the rear view moving image data G2 (Step S18). FIG. 6B is a diagram showing the frame image FG22 subjected to the mirror inversion.

Then, the control section 105 divides the frame image FG22 subjected to the mirror inversion into right and left images with the vanishing point VP detected at Step S10 as a dividing point (Step S19). For example, in a case where the vanishing point VP is at the center of the frame image FG22 (frame image FG2) subjected to the mirror inversion in the horizontal direction as shown in FIG. 6B, the control section 105 divides the frame image FG22 into a partial image FG22-L that is the left half of the frame image FG22 including the imaging area between [R90] and [R180] and a partial image FG22-R that is the right half of the frame image FG22 including the imaging area between [R0] and [R90].

Next, the control section 105 combines the right and left partial images FG22-R and FG22-L with the right and left edges of a frame image FG1 of the front view moving image data G1, respectively, with their positions after the mirror inversion being maintained (Step S20). That is, a new frame image FG4 is generated in which the left partial image FG22-L has been combined with the left edge of the frame image FG1 of the front view moving image data G1 and the right partial image FG22-R has been combined with the right edge of the frame image FG1 of the front view moving image data G1, as shown in FIG. 6C. Note that arrows shown in the frame images FG2, FG22, and FG4 in FIG. 6A to FIG. 6C indicate, for descriptive purposes, the movement directions of photographic subjects in each image in the front view moving image data G1 and the rear view moving image data G2.

Then, the control section 105 temporarily stores the frame image FG4 acquired by the image synthesis (Step S21). Hereafter, until image synthesis for the last frame is completed, the control section 105 repeats the processing of Step 17 and the following steps (NO at Step S22). Then, when image synthesis processing for the last frame is completed (YES at Step S22), the control section 105 replays on the display section 101 the moving image of moving image data including the temporarily stored frame image FG4 (Step S23).

As a result, the front view moving image data G1 and the rear view moving image data G2 can be shown to the user as a moving image where a front view that can be seen from a driver's seat of a moving automobile and right and left rear views in the right and left side mirrors have been arranged side by side.

Hereafter, until a recording instruction is given from the user, the control section 105 continues the playback of the synthetic moving image (NO at Step S24). When a recording instruction is detected (YES at Step S24), the control section 105 stores the temporarily stored moving image data as a new moving image file, in the image memory 107 (Step S25), and ends the processing.

As described above, in the image processing apparatus 100, in the case where the first mode has been set when the first moving image data G1 and the second moving image data G2 simultaneously captured and showing views in different imaging directions are replayed and displayed, single moving image data of substantially the entire surrounding area of the moving object M is generated from the first moving image data G1 and the second moving image data G2, and replayed on the display section 101. Also, in the case where the second mode has been set, single moving image data of a moving image where a front view and right and left rear views in right and left side mirrors have been arranged side by side is generated from the first moving image data G1 and the second moving image data G2, and replayed on the display section 101.

As a result of this configuration, a feeling of actually seeing a view can be maintained when a user replays and displays a wide-range image generated by captured images being combined.

Also, when direction information is included in at least one of the moving image files of the first moving image data G1 and the second moving image data G2, moving image data (the rear view moving image data in the above-described embodiment) to be divided is specified based on an imaging direction indicated by the direction information. That is, moving image data to be divided is automatically specified. As a result of this configuration, single moving image data centering on moving image data (the front view moving image data in the above-described embodiment) of a view in a specific direction can be generated and displayed without the user selecting moving image data to be divided.

Moreover, when direction information is not included in any of the moving image files of the first moving image data G1 and the second moving image data G2, motion vectors at a plurality of points are detected for each moving image data, and moving image data (the rear view moving image data in the above-described embodiment) to be divided is specified based the detected motion vector group. By this configuration as well, moving image data to be divided is automatically specified, and single moving image data centering on moving image data (the front view moving image data in the above-described embodiment) of a view in a specific direction can be generated and displayed without the user selecting moving image data to be divided.

In addition, since this moving image data to be divided is specified by the analysis of the first moving image data G1 and the second moving image data G2, the processing target moving image data are not necessarily required to have direction information. Also, by communication pathways being set before image capturing based on the premise that the imaging apparatus 200a captures front view moving image data and the imaging apparatus 200b captures rear view moving image data, single moving image data centering on moving image data of a view in a specific direction can be generated and displayed without the above-described specification processing.

Furthermore, the above-described vanishing point VP is specified based on a motion vector group detected from moving image data (the rear view moving image data G2) to be divided, and the point where the vanishing point VP is located is set as the dividing point of each frame image of the moving image data. As a result of this configuration, division target moving image data can be divided with a suitable point as its dividing point. Note that this vanishing point VP is not necessarily required to be specified, and a configuration may be adopted in which, as the dividing point of division target moving image data, a point is set from which the directions of the motion vectors of photographic subjects on the left side in the moving image data and the directions of the motion vectors of photographic subjects on the right side in the moving image data have a reverse relation.

In the above-described embodiment, the case has been mainly described in which targets to be processed by the image processing apparatus 100 are moving images captured with a viewing angle of 180 degrees in a horizontal direction. However, this viewing angle at the time of the image capturing of processing target moving images is not limited thereto and may be a viewing angle of arbitrarily determined degrees.

Also, in the above-described embodiment, targets to be processed by the image processing apparatus 100 are two moving images captured respectively by the different imaging apparatuses 200a and 200b. However, these processing target moving images may be, for example, two moving images captured by a single imaging apparatus.

Moreover, the above-described image processing apparatus 100 can be actualized by an arbitrary electronic apparatus having a function to serve as an imaging apparatus. In this case, the above-described processing may be performed with a moving image captured thereby and a moving image acquired from another imaging apparatus as processing targets. Also, the display section 101 is not necessarily required in the image processing apparatus 100, and the image processing apparatus 100 may be structured to merely output a moving image such as that generated from the first moving image data G1 and the second moving image data G2 as shown in FIG. 5C or FIG. 6C to an external display device.

Furthermore, in the above-described embodiment, the first moving image data G1 and the second moving image data G2 serving as processing targets are the data of moving images of views in the front and rear directions of the moving object M. However, the first moving image data G1 and second moving image data G2 may be the data of moving images of views in the right and left directions of the moving object M. In this case, if the first moving image data G1 and the second moving image data G2 are moving image data captured with a viewing angle of 180 degrees in the horizontal direction, the same processing as that of the above-described first mode is performed with moving image data of a view in a predetermined direction (such as the left direction) as a target to be divided.

Still further, in the above descriptions, targets to be processed by the image processing apparatus 100 are moving image data captured and stored in advance by the first imaging apparatus 200a and the second imaging apparatus 200b. However, the above-described processing of the embodiment may be performed with frame images that are being sequentially captured by the first imaging apparatus 200a and the second imaging apparatus 200b as targets. That is, the image processing apparatus 100 may perform the processing of generating and displaying a frame image such as that shown in FIG. 5C or FIG. 6C in real time.

In this case, a configuration may be adopted in which the movement speeds of the first imaging apparatus 200a and the second imaging apparatus 200b (movement speeds at imaging points) are checked and, when the movement speeds are equal to or below a predetermined speed, frame images acquired from them are displayed on two screens. That is, a configuration may be adopted in which, when the movement speeds of photographic subjects moving in moving images along with the movements of the first imaging apparatus 200a and the second imaging apparatus 200b are slow and therefore a burden on the user viewing each image is small, frame images acquired from them are displayed on two screens.

Note that, when each or both of the moving speeds of the first imaging apparatus 200a and the second imaging apparatus 200b are to be checked, speed information showing movement speed may be directly acquired from the first imaging apparatus 200a and the second imaging apparatus 200b so as to be checked. Alternatively, motion vectors may be detected from portions of preceding and subsequent frame images for two frames and the detected motion vector group may be checked as speed information showing the movement speed at the imaging point.

Also, in the above descriptions, targets to be processed by the image processing apparatus 100 are moving images. However, still images may be targets and be processed by the image processing apparatus 100. In this case, processing target still images are limited to those attached with imaging direction information.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising:
a first image sensor provided on a moving object where a progressing direction when the moving object moves is taken as an imaging direction;
a second image sensor provided on the moving object where an opposite direction of the progressing direction when the moving object moves is taken as an imaging direction; and
a control section,
wherein the control section:
acquires:
a first image outputted from the first image sensor as the moving object moves, and
a second image outputted from the second image sensor as the moving object moves, where an output timing of the first and second images from the respective first and second image sensors is the same,
detects, from the second image, motion vectors that are converging inwardly in the second image;
determines a dividing point of the second image based on the detected motion vectors;
divides the second image into a first partial image and a second partial image at the determined dividing point; and
combines the first partial image and the second partial image with edges of the first image, respectively.

2. The image processing apparatus according to claim 1, wherein the control section detects a vanishing point in the second image from the detected motion vectors, and determines a point where the detected vanishing point is located as the dividing point for the second image.

3. The image processing apparatus according to claim 1, wherein inputted two images are images captured by wide angle lenses, and
wherein the control section:
corrects the inputted two images to panoramic images having no distortion, and
divides the corrected second image into the first partial image and the second partial image.

4. The image processing apparatus according to claim 1, wherein inputted two images are moving images, respectively, and
wherein the control section divides a frame image of one moving image that corresponds to the second image from among the two moving image into a first partial image and a second partial image.

5. The image processing apparatus according to claim 4, wherein the control section:
acquires speed information indicating a movement speed of an apparatus capturing the two moving images or a movement speed of a moving object equipped with the apparatus at time of image capturing of the two moving images,
combines, with the edges of the first image, the first partial image and the second partial image acquired from the frame image of the one moving image captured when the movement speed indicated by the acquired speed information is equal to or faster than a predetermined speed.

6. An image processing method comprising:
an image acquiring step of acquiring:
a first image outputted from a first image sensor provided on a moving object where a progressing direction when the moving object moves is taken as an imaging direction; and
a second image outputted from a second image sensor provided on the moving object where an opposite direction of the progressing direction when the moving object moves is taken as an imaging direction, an output timing of the first and second images from the respective first and second image sensors being the same;
a detecting step of detecting, from the second image, motion vectors that are converging inwardly in the second image;
a determining step of determining a dividing point of the second image based on the detected motion vectors;
a dividing step of dividing the second image into a first partial image and a second partial image at the determined dividing point; and
a combining step of combining the first partial image and the second partial image with edges of the first image, respectively.

7. A non-transitory computer-readable storage medium having stored thereon a program that is executable by a computer to actualize functions comprising:
image acquiring processing for acquiring:
a first image outputted from a first image sensor provided on a moving object where a progressing direction when the moving object moves is taken as an imaging direction; and with which a progressing direction is associated as an imaging direction and
a second image outputted from a second image sensor provided on the moving object where an opposite direction of the progressing direction when the moving object moves is taken as an imaging direction, an output timing of the first and second images from the respective first and second image sensors is the same;

detecting processing for detecting, from the second image, motion vectors that are converging inwardly in the second image;

determining processing for determining a dividing point of the second image based on the detected motion vectors;

dividing processing for dividing the second image into a first partial image and a second partial image at the determined dividing point; and combining processing for combining the first partial image and the second partial image with edges of the first image, respectively.

* * * * *